United States Patent [19]

Woolf

[11] Patent Number: 4,926,841

[45] Date of Patent: May 22, 1990

[54] WEATHER PROOF ASH CONTAINMENT SYSTEM FOR BARBEQUES

[76] Inventor: Douglas M. Woolf, 105 Mount Etna Dr., Clayton, Calif. 94517

[21] Appl. No.: 394,913

[22] Filed: Aug. 17, 1989

[51] Int. Cl.⁵ ............................................. F23J 1/00
[52] U.S. Cl. .................................. 126/243; 126/25 R
[58] Field of Search ............... 126/25 R, 242, 243, 126/244, 245, 9 R, 9 B; 248/509, 152, 150, 149; 108/47

[56] References Cited

U.S. PATENT DOCUMENTS

| | | | |
|---|---|---|---|
| 3,209,743 | 10/1965 | Stewart et al. | 126/25 |
| 3,500,812 | 3/1970 | Korngold | 126/25 R |
| 3,515,122 | 6/1970 | Andrews | 126/243 |
| 4,576,140 | 3/1986 | Schlosser | 126/25 R |
| 4,628,901 | 12/1986 | Poulos | 126/243 |
| 4,741,322 | 5/1988 | Lin | 126/25 R |
| 4,763,640 | 8/1988 | Schmack et al. | 126/243 |

Primary Examiner—James C. Yeung
Attorney, Agent, or Firm—Henderson & Sturm

[57] ABSTRACT

An ash catching apparatus (10) for barbeque kettle (100) including a frustro-conical ash catching receptacle (13) support at a selected distance from the apertured bottom (102) of the grill (100) by a plurality of support members (12) that are movably disposed on the support legs (103) of the kettle (100) and a weather ring (20) attached to the bottom (102) of the cooking receptacle (101) and dimensioned to prevent wind and rain from entering into the mouth (13') of the ash catching receptacle.

9 Claims, 1 Drawing Sheet

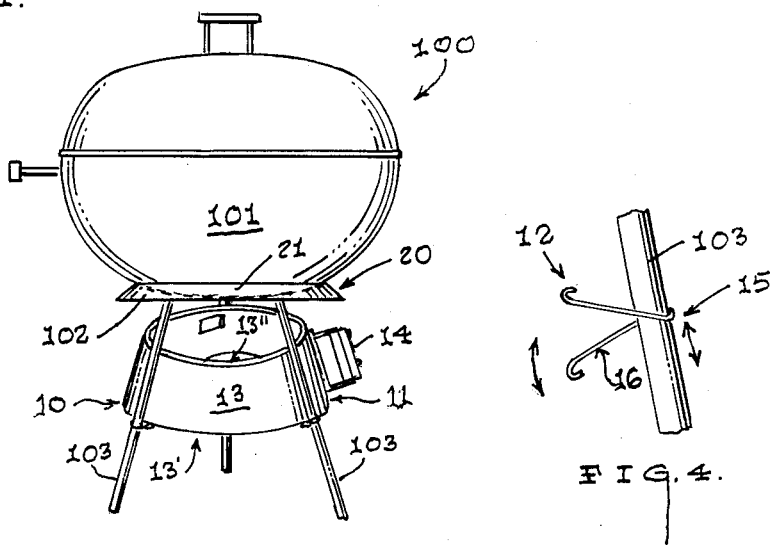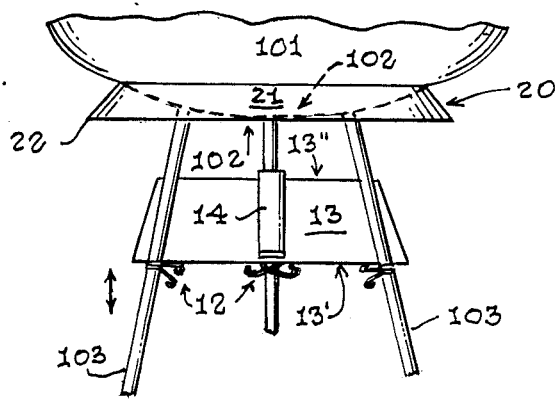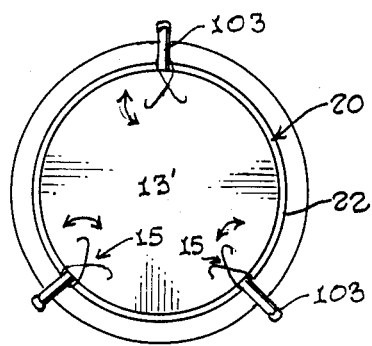

4,926,841

WEATHER PROOF ASH CONTAINMENT SYSTEM FOR BARBEQUES

TECHNICAL FIELD

The present invention relates generally to the field of ash catchers and more particularly to an ash catcher for barbeques.

BACKGROUND OF THE INVENTION

This invention was the subject matter of Document Disclosure Program Registration No. 216,390 which was filed in the U.S. Patent and Trademark Office on Dec. 19, 1988.

As can be seen by reference to the following U.S. Pat. Nos. 4,763,640; 4,741,322; 4,628,901; and 3,209,743 the prior art is replete with myriad and diverse arrangements for collecting ashes from a barbeque grill or kettle.

Needless to say, anyone who has used a barbeque grill is aware of the mess that results from the accumulation of spent ash at the bottom of a conventional grill or kettle; and, even though the aforementioned prior art constructions minimize to a great extent the chore of collecting and removing the ashes, these devices do not by any means represent the last word in this particular area of technology.

As a consequence of the foregoing situation there has existed a longstanding need among users of this type of a device for a new and simpler means of supporting and suspending an ash collection receptacle at a desired height beneath the ash outlet openings in the main body of the kettle; and, the provision of such a device is a stated objective of the present invention.

SUMMARY OF THE INVENTION

Briefly stated, the present invention was specifically developed for a three legged kettle type barbeque grill wherein an ash receptacle is intended to be removably supported relative to the bottom of the cooking receptacle per se.

Along those lines, the ash catching apparatus that forms the basis of the present invention comprises in general: an ash catching receptacle; a weather ring; and a plurality of support members that are movably connected to the respective support legs on the kettle receptacle.

As will be explained in greater detail further on in the specification the support members are disposed for relative rotation and/or reciprocation relative to each support leg to both accommodate the insertion of the ash receptacle beneath the kettle and/or vary the relative distance of the mouth of the ash receptacle with respect to the ash openings in the bottom of the kettle.

In addition, the weather ring is disposed adjacent to the bottom of the barbeque kettle and comprises an outwardly flared skirt member whose outer periphery projects beyond the mouth of the ash catching receptacle to prevent rain from entering into the ash catching receptacle.

BRIEF DESCRIPTION OF THE DRAWINGS

These and other objects, advantages and novel features of the invention will become apparent from the detailed description of the best mode for carrying out the invention which follows; particularly when considered in conjunction with the accompanying drawings, wherein:

FIG. 1 is a perspective view of the ash catching apparatus installed on a kettle barbeque;

FIG. 2 is a partial side elevation view of the apparatus disposed on a kettle barbeque;

FIG. 3 is a bottom plan view of the apparatus disposed on a barbeque; and,

FIG. 4 is an enlarged detail view of one of the support members mounted on one of the support legs of the barbeque.

BEST MODE FOR CARRYING OUT THE INVENTION

As can be seen by reference to the drawings and in particular to FIGS. 1 and 2, the ash catcher apparatus that forms the basis of the present invention is designated generally by the reference numeral (10). The ash catcher apparatus (10) comprises in general: an ash catching receptacle (11); a plurality of support members (12); and, a weather ring (20) which will be described presently in seriatim fashion.

Prior to embarking on the detailed description of the ash catching apparatus (10); it would first be advisable to describe the typical barbeque grill construction (100) that the ash catching apparatus (10) was specifically designed for use in conjunction with.

As can best be appreciated by reference to FIGS. 1 and 2, the barbeque grill construction (100) comprises a cooking receptacle (101) having a plurality of apertures (not shown) in the bottom (102) (shown in phantom) of the cooking receptacle (101); wherein, the apertures serve the dual purpose of allowing air to enter through the bottom (102) of the cooking receptacle (101), as well as, allowing spent ash to fall by gravity out of the bottom (102) of the cooking receptacle (101) in a well recognized fashion.

In addition, the barbeque grill construction (100) also comprises a plurality of support legs (103) which project outwardly and downwardly from the bottom (102) of the cooking receptacle (101) in a well recognized fashion to support the cooking receptacle (101) at a desired height above the ground.

As can also be seen by reference to FIGS. 1 and 2, the ash catching receptacle (11) comprises in general: an enlarged frustro-conical receptacle member (13) dimensioned to be received between the adjacent support legs (103) of the grill construction (100); and, provided with at least one handle member (14) to accommodate the insertion and removal of the receptacle member (13) relative to the support legs (103) of the grill construction (100).

Turning now to FIGS. 2 thru 4, it can be seen that the plurality of support members (12) of the ash catching apparatus (10) each comprise a movable elongated bracket element (15) operatively engaged with one of the support legs (103) of the grill construction (100).

In addition as can be appreciated particularly by reference to FIGS. 3 and 4, each of the elongated bracket elements (15) comprise an elongated twisted wire member (16) that is frictionally engaged with the periphery of the respective grill support legs (103); wherein, the bracket elements (15) may be rotated and/or vertically translated relative to the grill support legs (103) to accommodate the insertion of the ash catching receptacle (13) both between the support legs (103) and at a desired height relative to the bottom (102) of the cooking receptacle (101), in a well recognized manner.

Returning once more to FIGS. 1 and 2, it can be seen that the spacing between the mouth (13") of the ash catching receptacle (13) relative to the bottom (102) of the cooking receptacle (101) can be varied depending upon the selected height that the support members (12) are disposed relative to each of the grill support legs (103) and the bottom (13') of the ash catching receptacle (13).

As can best be seen by reference to FIGS. 1 thru 3, the weather ring (20) comprises an outwardly and downwardly flared skirt member (21) which is secured around the periphery of the bottom (102) of the cooking receptacle (101); wherein, the outer edge (22) of the flared skirt member (21) has a diameter which is substantially greater than the diameter of the mouth (13") and at least approximately equal to the diameter of the bottom (13') of the ash catching receptacle (13).

As a consequence of the foregoing dimensioning of the flared skirt member (21) relative to the ash catching receptacle (13), the skirt member (21) will act as a weather guard to prevent wind and rain from disturbing the accummulated ashes within the ash catching receptacle (13).

Having thereby described the subject matter of this invention it should be apparent that many substitutions, modifications and variations of the invention are possible in light of the above teachings. It is therefore to be understood that the invention as taught and described herein is only to be limited to the extent of the breadth and scope of the appended claims.

I claim:

1. An ash catching apparatus for barbeque grills including a cooking receptacle having an apertured bottom and a plurality of support legs projecting outwardly and downwardly with respect to the apertured bottom wherein the ash catching apparatus comprises:
    an ash catching receptacle comprising an enlarged frusto-conical receptacle member dimensioned to be received between adjacent legs of said plurality of support legs;
    a plurality of support members wherein each of the plurality of support members are operatively and movably disposed on respective ones of said plurality of support legs for supporting the ash catching receptacle relative to the bottom of the cooking receptacle; and,
    a weather ring including an outwardly and downwardly flared skirt member which is operatively attached to the bottom of the cooking receptacle.

2. The apparatus as in claim 1 wherein the ash catching receptacle is provided with at least one handle member.

3. The apparatus as in claim 1 wherein the support members are rotatably disposed on the support legs of the barbeque grill.

4. The apparatus as in claim 1 wherein the support members are vertically displaceable on the support legs of the barbeque grill.

5. The apparatus as in claim 1 wherein the support members are both rotatably disposed and vertically displaceable on the support legs of the barbeque grill.

6. The apparatus as in claim 5 wherein each of the plurality of support members comprises:
    an elongated bracket element operatively engaged with the periphery of one of the plurality of support legs.

7. The apparatus as in claim 6 wherein each elongated bracket element comprises:
    an elongated twisted wire member.

8. The apparatus as in claim 1 wherein the outer periphery of the flared skirt member has a diameter that is substantially greater than the diameter of the mouth of the ash catching receptacle.

9. The apparatus as in claim 8 wherein the outer periphery of the flared skirt member is at least approximately equal to the diameter of the bottom of the ash catching receptacle.

* * * * *